Patented Nov. 21, 1939

2,180,742

UNITED STATES PATENT OFFICE 2,180,742

PROCESS OF REFINING CLAY

Sanford C. Lyons, Bennington, Vt., assignor to Bird Machine Co., Walpole, Mass., a corporation of Massachusetts No Drawing. Application May 12, 1937,
Serial No. 142,180

13 Claims. (Cl. 252—8)

This invention relates to a process of refining clay and deals more especially with a process designed to rid the clay of various impurities, especially colored impurities, and thus to improve the clay for use as a filler or coating in paper and other products wherein clay of maximum whiteness and substantial freedom from coarse or gritty impurities is desired.

In accordance with prior art clay-refining practice, the crude or freshly quarried clay is blunged to produce an aqueous clay suspension or so-called clay slip of the desired solids content. Coarse impurities, such as sand and mica, are then removed from the clay suspension in any suitable way, for instance, by settling, centrifugation, or similar treatment. The clay suspension largely or substantially free from coarse or gritty impurities may then be treated with a reducing agent, preferably hyposulphurous acid or hyposulphite, capable of reducing and solubilizing the ferric oxide or analogous coloring impurities invariably associated with crude clay to yield substantially colorless ferrous or similar metal salt.

In practicing the steps above outline, trouble is apt to be encountered in maintaining the ferrous or similar substantially colorless, water-soluble salts in their colorless, water-soluble condition to the very end of the refining process, that is, through such subsequent washing treatments as the clay may undergo up to the stage where the clay has been recovered by filtration or otherwise from the aqueous suspending medium. Thus, ferrous salts are prone to hydrolyze especially when extensively diluted with water, as during the rinsing of an aqueous clay suspension in whose aqueous suspending medium they are present; and such hydrolysis is productive of ferrous hydroxide which oxidizes readily into brown and relatively insoluble ferric hydroxide in the presence of air such as is inevitably dissolved in slight amount in the water along with the ferrous hydroxide and such as is mechanically entrapped to some extent in the water when the clay suspension is more or less agitated during washing. While the tendency of dissolved ferrous salts to undergo undesirable hydrolysis and oxidation to form colored ferric hydroxide may be mitigated considerably by rendering the aqueous medium distinctly acid, yet undue expense would be entailed in adding to a decolorized clay suspension ac'd in sufficient amount to repress to a significant extent the hydrolyzing and oxidizing tendency of colorless ferrous salts dissolved in the aqueous suspending medium, namely, to an extent such that very little residue of ferric oxide or other colored impurities are left in the clay recovered from aqueous suspension. On the other hand, when an aqueous clay suspension containing dissolved ferrous salts is put through washing and/or filtering treatments while in substantially neutral condition, it is nigh impossible, by reason of the sensitivity of ferrous salts to become transformed into ferric oxide in a substantially neutral aqueous medium, to rid the clay of practically all color, especially the brownish cast of ferric oxide, whose presence even in very small amount in the finished clay product detracts measurably from the whiteness and brightness potentially realizable in such product.

The process hereof may be carried out generally as heretofore up to and including the treatment of the clay suspension with hyposulphurous acid or equivalent reducing or decolorizing agent. The instant invention, however, is centered about the addition to the decolorized clay suspension of sodium hexametaphosphate, which I have discovered as having the surprising and valuable property of maintaining ferrous or similar colorless metal salts in solution in their colorless or reduced states even when the solution is neutral and/or undergoes extensive dilution with water, that is, even under conditions otherwise promoting a regeneration or precipitation of colored ferric oxide from the substantially colorless soluble ferrous salts and the occlusion or adsorption of at least part of the ferric oxide by the clay particles present in the aqueous suspending medium wherein such ferric oxide has been regenerated or precipitated.

There are various ways of applying the invention hereof in clay-refining processes which involve generally the blunging of crude or freshly quarried clay to form an aqueous clay suspension of the desired consistency or solids content, the removal of coarse impurities or grit from the clay suspension, the treatment of the substantially grit-free suspension with a reducing agent capable of reducing the iron oxide or similar insoluble coloring impurities invariably associated with the crude clay into colorless, water-soluble compounds and, if desired, the chemical dispersion or deflocculation of clay aggregates prior to the removal of the coarse impurities from the clay suspension, as by settling or centrifugation. In those instances when the aqueous clay suspension is being processed at a solids content of, say, about 25% to 45%, it may be distinctly advantageous to add to the suspension such clay-dispersing agents as reduce the viscosity of the suspension markedly and thus accelerate the subsidence of coarse impurities. Of course, the treatment of the aqueous clay suspension with the reducing agent for the ferric oxide may precede or succeed the removal of coarse impurities from the suspension, although, unless such coarse impurities together with such coarse clay solids as may be removed from the suspension are to be put to uses requiring them to be free of color, the addition of such reducing agent to the aqueous clay suspension preferably succeeds the removal of coarse impurities from the suspension, thereby avoiding unnecessary consumption of the reducing agent on the coarse impurities or coarse clay solids. Having thus outlined the general aspects of the clay-refining processes hereof, I shall now set forth some specific examples of procedure embodying the instant invention.

*Example I*

An aqueous suspension of crude or freshly quarried clay of, say, about 20 to 25% solids content, may be put through a settling, centrifuging, or similar treatment under conditions conducive to the substantial elimination from the suspension of its content of coarse or gritty impurities and clay particles, say, particles coarser than about 325 mesh. The resulting substantially grit-free suspension is then treated with hyposulphurous acid, hyposulphite, or equivalent reducing agent in amount sufficient to ensure a reduction of the iron oxide and similar coloring impurities associated with the raw clay to colorless, water-soluble compounds. If desired, such reducing or decolorizing treatment may be performed in an electrolytic cell wherein sulphurous acid or sulphite is being reduced in situ in the clay suspension to hyposulphurous acid or hyposulphite preferably in the presence of a suitable mineral acid, such as sulphuric acid, which promotes reduction and dissolution of the coloring impurities. The electrolytic cell may advantageously be of the types disclosed in my application Serial No. 141,496, filed May 3, 1937, and application Serial No. 156,138, filed July 28, 1937, which cells combine with the reducing or decolorizing action on the iron oxide or other colored clay impurities a shearing or mechanical reducing action on clay aggregates present in the suspension, thereby breaking up such aggregates into finer clay particles as well as exposing the colored impurities on the surfaces of such finer clay particles to the chemical reduction or decolorization of the nascent hyposulphurous acid, hyposulphite, or the like.

The decolorized clay suspension containing the dissolved colorless iron compounds in the form of ferrous salts is treated with sodium hexametaphosphate in amount controlled to maintain the iron in solution as colorless compounds without chemically dispersing or deflocculating the clay to any appreciable or noteworthy degree, since appreciable chemical dispersion or deflocculation of the clay would render difficult subsequent washing of the clay with water and/or the recovery of the clay solids by filtration, as in a filter press or rotary filler, without incurring appreciable loss of clay. In this connection, it might be noted that should an excessive amount of sodium hexametaphosphate be added to the decolorized clay suspension, the excess would, by reason of the powerful dispersing or deflocculating action of the sodium hexametaphosphate on clay, make for difficulty in settling the clay solids after washing of the suspension with water;

and the finely dispersed or deflocculated clay would tend to pass through a filter along with the aqueous filtrate. It is thus seen that it is important to adjust the sodium hexametaphosphate addition to the decolorized clay suspension to comport with a maintenance of the ferrous or other colorless salts in solution while avoiding any noteworthy chemical dispersing effect on the clay particles. For many clay suspensions, less than 0.5% of sodium hexametaphosphate, based on the weight of solids in suspension, is necessary to keep the ferrous or other colorless salts in solution as such while avoiding marked chemical dispersing action on the clay particles. After the addition of the hexametaphosphate to the decolorized clay suspension, the suspension may be washed one or more times with water followed by decantation of the water after the clay solids have been permitted to settle or concentrate so as to leave substantially clear supernatant aqueous medium. The washed clay solids may then be filtered out of suspension as cakes or putty-like masses and, if desired, dried preparatory to shipment. In some instances, the filtration of the clay solids from suspension may be performed without appreciable washing of the suspension, particularly as the hexametaphosphate holds practically all the iron in dissolved colorless condition in the aqueous medium so that the iron or similar potentially coloring impurity escapes through the filter along with the aqueous medium, leaving only a minute trace of potentially coloring impurity in the recovered clay solids.

*Example II*

The procedure of this example may include a treatment of the crude clay suspension with sodium silicate, caustic soda, or similar chemical dispersing agent for the clay in the amount of, say, about ½ to 1½%, based on the solids content of the suspension. Such a treatment may be desirable particularly in those instances when the clay suspension is of a solids content upwards of about 25%, say, about 25% to 45%, and the suspension is so thick or viscous that it is difficult and time-consuming to settle out coarse impurities without loss of a substantial fraction of the valuable fine clay solids by reason of the enmeshment or entrainment of such solids with the settled coarse impurities. When sodium silicate or like clay-dispersing agent is added to such viscous clay suspension, the viscosity of the suspension is immediately reduced so decidedly that coarse impurities, say, those of a coarseness greater than about 325 mesh, are comparatively quickly and sharply removable from suspension by settling or centrifuging treatment. Once the coarse impurities have been removed from suspension, the resulting substantially grit-free suspension may be put through uitable chemical reduction or decolorization, as already described, in consequence of which the clay solids are flocculated sufficiently to enable washing and/or filtering of the clay solids from suspension without serious loss of the intrinsically finest or colloidal clay particles. In this latter regard, it might be noted that the hyposulphurous acid, hyposulphite, or like chemical reducing or decolorizing agent being effective especially in the presence of strong or mineral acid, such as sulphuric acid, is preferably used in the presence of such strong acid; and it is such strong acid and/or the hyposulphurous acid that brings about the desired flocculation of the previously finely dispersed clay particles. Of course, when an alkaline dispersing agent, such as sodium silicate or caustic soda, is initially used in the clay suspension to facilitate the removal of coarse impurities therefrom, the mineral acid and/or hyposulphurous acid subsequently added for decolorizing purpose to the suspension neutralizes such dispersing agent and thus induces the desired flocculation of the clay particles. Rather than treating the substantially grit-free clay suspension as a whole with the chemical reducing or decolorizing agent, such suspension may be centrifugally fractionated into two or more clay fractions, as disclosed in my application Serial No. 89,886, filed July 10, 1936, whereupon each clay fraction may be separately suspended in water and treated with the chemical reducing or decolorizing agent in amount appropriate for developing the desired substantially colorless condition.

As in Example I, the decolorized clay suspension as a whole or the separate clay fractions into which the suspension has been centrifugally resolved may be treated with sodium hexametaphosphate in amount predetermined to maintain in dissolved colorless condition the iron or similar potentially coloring impurities while avoiding chemical redispersion of the clay that would lead to clay loss in substantial amount during subsequent washing and/or filtration of the clay solids. Washing and/or filtration of the clay solids may be carried out as in Example III and the filtered clay solids may be dried preparatory to storage or shipment.

*Example III*

According to this example, the crude or freshly quarried clay suspension may be first treated, as already described, with a chemical reducing or decolorizing agent, whereupon sodium hexametaphosphate may be added to the decolorized clay suspension in amount predetermined merely to hold in solution as colorless salts the iron or similar potentially coloring impurities, that is, without material dispersion of the clay into finer particle size. Inasmuch as the resulting decolorized clay suspension is apt to be quite thick or viscous, especially at a solids content of about 25% to 45%, it may be distinctly desirable to add to such suspension a clay-dispersing agent so as to facilitate subsequent removal of sand, mica, or other coarse impurities, as by settling or centrifuging treatment. The clay-dispersing agent may be any one of those ordinarily employed, although it is preferable to use sodium hexametaphosphate as the clay dispersing agent by reason of its extraordinarily high clay-dispersing potency. Indeed, sodium hexametaphosphate presents the advantage that it may be used for realizing a given clay-dispersive effect in amount much less than when the usual or heretofore known clay-dispersing agents are employed. In many instances, clay suspensions of a solids content of, say, about 25% to 45% require only about 0.1% to 0.3% of sodium hexametaphosphate, based on the solids content of the suspension, beyond that originally used to keep in solution as colorless salts the iron or similar potentially coloring impurities, to bring about an extremely fine or colloidal dispersion of the clay solids and the accompanying desired drastic reduction in the viscosity of the suspension that enables ready gravitational or centrifugal separation of the coarse impurities with the desired selectivity, that is, with minimum loss of clay in the separated impurities. After the selective settling of the coarse impurities from the finely dispersed clay suspension has been performed herein, as by gravitational settling or by centrifugation, the clay solids may be recovered from the suspension in any suitable manner. For instance, the substantially grit-free suspension may be treated with a clay-flocculating agent, such as alum, in amount to effect the desired flocculating action on the clay particles, whereupon the clay flocks may be recovered substantially completely by filtration in filter presses or the like, such as are commonly used in the clay industry, and the clay cakes or filtered clay masses thus recovered finally dried to the desired very low residual moisture content. In other instances, the clay may be recovered from suspension as grades of different particle size, as by the centrifugal fractionation method of my application Serial No. 89,886, filed July 10, 1936. The centrifugal fractionating method may involve passing the substantially grit-free suspension through two or more centrifuges, the last one of which is an electrophoretic centrifuge of the type disclosed in my application Serial No. 2,369, filed January 18, 1935, which type of centrifuge operates to separate the fine and colloidal clay solids from suspension under combined centrifugal and electrophoretic forces and to emit the recovered clay solids as a stiff, putty-like mass adapted to be subjected to the final drying operation. In lieu of using such an electrophoretic centrifuge as the last centrifuging stage, however, the effluent clay suspension from a previous centrifuge containing the finest and colloidal clay solids may be treated with alum or similar flocculating agent and the flocculated clay filtered out of suspension and then dried. In recovering or largely dewatering clay solids in an electrophoretic centrifuge, it is necessary for best results that the suspended clay particles be very finely or colloidally dispersed and thus be susceptible of strong electro-attraction or electrophoresis and also that the electro-conductance of the aqueous slurry and more particularly the electro-conductance of the aqueous suspending medium be at as low a value as possible in order to avoid dissipation of the electrical agency in causing electrolysis of the aqueous medium. Because the sodium hexametaphosphate useful accordant with the present invention for clay-dispersive action as well as for maintaining iron in solution as colorless iron salt need be present in only very small amount in an aqueous clay suspension being put through electrophoretic centrifugation herein for the recovery of the clay solids, the electro-conductance of the slurry and its aqueous medium are maintainable at a very low value such as enables high output of recovered clay solids and low power consumption by the electrophoretic centrifuge.

There are other noteworthy advantages in using sodium hexametaphosphate not only to inhibit reversion of colorless ferrous salts in solution to ferric oxide but also to promote dispersion of the clay into much finer or colloidal particles. Thus, when some clay-dispersing agents, including sodium silicate, are left even in small amount in the largely dewatered, refined clay that is subjected to a final drying operation, they tend upon drying to harden and in some measure to cement together the very fine or colloidal clay particles into aggregates which detract from the value of the finished clay product for such uses as making high grade coated printing papers, whose desired qualities of homogeneity or smoothness of surface, gloss, and capability of receiving clean-cut imprints depend on extremely fine or colloidal clay particle size. Because the residue of sodium hexametaphosphate left in refined clay products producible by the present invention is even less than the residue of sodium silicate or other dispersing agent appearing in refined clay products as heretofore produced and because the metaphosphate radical does not tend to form water-insoluble compounds upon drying, like the silica gel developed by drying sodium silicate especially at elevated temperature, the finished or dried refined clay products prepared pursuant to the present invention with sodium hexametaphosphate as a clay-dispersing agent yield aqueous paper-coating compositions freer from clay aggregates than those compositions containing refined clay products whose preparation involves the use of sodium silicate or other clay-dispersing agents. It will, of course, be appreciated that the avoidance, so far as is possible, of clay aggregates in refined clay products is of considerable significance when such products are destined for many uses other than in paper-coating compositions.

The ability of sodium hexametaphosphate to hold iron in solution as substantially colorless iron salt is evidently attributable to the formation of a substantially non-dissociated, colorless, complex ion wherein iron and hexametaphosphate are in combination in one form or another. In this connection, it might be noted that ferruginous aqueous extract obtained from the chemical decolorization of iron-contaminated clay slurry and containing ferrous iron combined in the form of sulphite, sulphate, or other substantially colorless salt will ordinarily yield a copious blue precipitate when a little ferricyanide solution is added thereto. On the other hand, when a little sodium hexametaphosphate is added to such ferruginous aqueous extract prior to the addition of the ferricyanide solution, no blue precipitate whatever occurs. In other words, the iron is in such latter case held in solution but evidently in the form of a colorless complex ion whose ionization is so drastically restricted or limited by the hexametaphosphate grouping or radical that it will not yield a precipitate even with ferricyanide.

Apropos of the powerful clay-dispersive property of sodium hexametaphosphate and, accordingly, the possibility of using this clay-dispersing chemical in a clay-refining process in smaller amount than that necessary in the case of sodium silicate or other usual clay-dispersing agent, it might be mentioned that such reduction in the amount of dispersing agent makes possible also a reduction in the amount of flocculating agent necessary when the clay solids are to be recovered from the aqueous slurry by filtration. The cost of flocculating agent to be used in a clay-refining process may hence be lowered materially. It is possible to use for clay-dispersing purpose accordant with the instant invention a mixture of sodium hexametaphosphate and one or more clay-dispersing agents such as have been used heretofore. Thus, sodium hexametaphosphate may be advantageously used along with sodium metasilicate in dispersing in water those clays which, by virtue of their inherently exceptionally fine or colloidal particle size, are notoriously resistant to dispersion into their intrinsically very fine or colloidal particles. Typical of such highly colloidal clays of refractory or difficultly dispersible character is that occurring at Swift Creek, Georgia. When a mixture of sodium hexametaphosphate and sodium metasilicate is added to a suspension of highly refractory clay taken from the deposits in that region, it is found that such mixed dispersing agents are far more effective in their clay-dispersive effect than any of the wide variety of dispersing agents of which applicant is aware.

It might be noted that the sodium hexametaphosphate sold as "Calgon" and useful for the purposes hereof is being produced currently in large quantities by a process which involves melting sodium metaphosphate at red heat and then cooling the molten mass. In the broader aspects of the instant invention, the salts of the various polymeric metaphosphoric acid may be used in lieu of sodium hexametaphosphate for the purposes hereof; but, of all such polymetaphosphates as exist, it is distinctly preferable to use hexametaphosphate of sodium or equivalent alkali on account of its surprisingly high effectiveness for the purposes hereof.

I claim:

1. In a process of refining aqueous clay suspension containing ferric oxide as a coloring impurity and involving the reduction of the ferric oxide in the suspension to a substantially colorless, water-soluble ferrous salt, those steps which comprise treating the suspension containing dissolved therein the colorless ferrous salt with alkali-metal polymetaphosphate in amount sufficient to inhibit reversion of such salt to ferric oxide; and separating the clay from suspension.

2. In a process of refining aqueous clay suspension containing ferric oxide as a coloring impurity and involving the reduction of the ferric oxide in the suspension to a substantially colorless, water-soluble ferrous salt, those steps which comprise treating the suspension containing dissolved therein the colorless ferrous salt with alkali-metal polymetaphosphate in amount sufficient to inhibit reversion of such salt to ferric oxide, washing the clay suspension, and separating the clay from suspension.

3. In a process of refining aqueous clay suspension containing ferric oxide as a coloring impurity and involving the reduction of the ferric oxide in the suspension to a substantially colorless, water-soluble ferrous salt, those steps which comprise treating the suspension containing dissolved therein the colorless ferrous salt with sodium hexametaphosphate in amount sufficient to inhibit reversion of such salt to ferric oxide while avoiding dispersion of the clay to significantly finer particle size; and separating the clay from suspension.

4. In a process of refining aqueous clay suspension containing ferric oxide as a coloring impurity and involving the reduction of the ferric oxide in the suspension to a substantially colorless, water-soluble ferrous salt, those steps which comprise treating the suspension containing dissolved therein the colorless ferrous salt with sodium hexametaphosphate in amount sufficient to inhibit reversion of such salt to ferric oxide while avoiding dispersion of clay to significantly finer particle size, washing the clay suspension, and separating the clay from suspension.

5. In a process of refining crude clay associated with ferric oxide as coloring impurity and associated also with sand, mica and similar coarse impurities, those steps which comprise suspending the crude clay in water, separating out coarse impurities from the suspension, treating the resulting suspension with a chemical reducing agent capable of reducing the ferric oxide present therein to a substantially colorless, water-soluble ferrous salt, treating the suspension containing dissolved therein the colorless ferrous salt with sodium hexametaphosphate in amount suffiient to inhibit reversion of such salt to ferric xide, and separating the clay from suspension.

6. In a process of refining aqueous clay suspension containing ferric oxide as a coloring impurity and involving the reduction of the ferric xide in the suspension to a substantially colorless, water-soluble ferrous salt, those steps which omprise suspending the crude clay in water, dding a clay-dispersing agent to the resulting uspension to disperse the clay to finer particle ize and thus simultaneously to reduce the visosity of the suspension, separating out coarse npurities from the suspension, treating the reulting suspension with a chemical reducing agent apable of reducing the ferric oxide present there-1 to a substantially colorless, water-soluble ferous salt, treating the suspension containing dissolved therein the colorless ferrous salt with sodium hexametaphosphate in amount sufficient to ahibit reversion of such salt to ferric oxide, and eparating the clay from suspension.

7. In a process of refining aqueous clay suspensions containing ferric oxide as a coloring mpurity and involving the reduction of the ferric xide in the suspension to a colorless, water-soluble errous salt, those steps which comprise treating he suspension containing dissolved therein the olorless ferrous salt with sodium hexametaphosphate in amount sufficient both to inhibit reverion of such salt to ferric oxide and to disperse he clay to finer particle size; and separating he clay from suspension.

8. In a process of refining crude clay associated /ith ferric oxide as coloring impurity and assoiated also with sand, mica and similar coarse mpurities, those steps which comprise suspendng the crude clay in water, treating the resultng suspension with a chemical reducing agent apable of reducing the ferric oxide present in the uspension to a substantially colorless, wateroluble ferrous salt, adding to the suspension conaining dissolved therein the colorless ferrous salt odium hexametaphosphate in amount sufficient oth to inhibit reversion of such salt to ferric xide and to disperse the clay to finer particle ize, separating out coarse impurities from the uspension, and recovering the clay from susension.

9. In a process of refining an aqueous susension of crude clay associated with ferric oxide nd coarse impurities, those steps which comrise reducing such ferric oxide as may be presnt in the clay suspension to a colorless ferrous alt, adding to the resulting clay suspension sufficient alkali-metal polymetaphosphate to effect narked dispersive action on the clay as well as o inhibit formation of iron oxide from such olorless ferrous salt as may occur in the resulting clay suspension, separating out coarse impurities from the resulting clay suspension, and recovering the clay from suspension.

10. In a process of refining an aqueous suspension of crude clay associated with ferric oxide and coarse impurities, those steps which comprise reducing such ferric oxide as may be present in the clay suspension to a colorless ferrous salt, adding to the resulting clay suspension sufficient sodium hexametaphosphate to effect marked dispersive action on the clay as well as to inhibit formation of iron oxide from such colorless ferrous salt as may occur in the resulting clay suspension, separating out coarse impurities from the resulting clay suspension, and recovering the clay from suspension.

11. In a process of refining an aqueous suspension of crude clay associated with ferric oxide and coarse impurities, those steps which comprise reducing such ferric oxide as may be present in the clay suspension to a colorless ferrous salt, adding to the resulting clay suspension sufficient sodium hexametaphosphate to effect marked dispersive action on the clay as well as to inhibit formation of iron oxide from such colorless ferrous salt as may occur in the resulting clay suspension, separating out coarse impurities from the resulting clay suspension, adding a clay-flocculating agent to the suspension, and filtering the flocculated clay from suspension.

12. In a process of refining an aqueous suspension of crude clay associated with ferric oxide and coarse impurities, those steps which comprise reducing such ferric oxide as may be present in the clay suspension to a colorless ferrous salt, adding to the resulting clay suspension sufficient sodium hexametaphosphate to effect marked dispersive action on the clay as well as to inhibit formation of iron oxide from such colorless ferrous salt as may occur in the resulting clay suspension, separating out coarse impurities from the resulting clay suspension, and centrifugally separating the clay from suspension.

13. In a process of refining an aqueous suspension of crude clay associated with ferric oxide and coarse impurities, those steps which comprise reducing such ferric oxide as may be present in the clay suspension to a colorless ferrous salt, adding to the resulting clay suspension sufficient sodium hexametaphosphate to effect marked dispersive action on the clay as well as to inhibit formation of iron oxide from such colorless ferrous salt as may occur in the resulting clay suspension, separating out coarse impurities from the resulting clay suspension, and separating the clay from suspension under combined centrifugal and electrophoretic forces.

SANFORD C. LYONS.